M. J. McCOY.
COMBINED PLOW AND PACKER.
APPLICATION FILED JUNE 21, 1920.

1,412,950.

Patented Apr. 18, 1922.
2 SHEETS—SHEET 1.

Inventor
Michael J. McCoy.
By Hiram A. Sturges,
Attorney

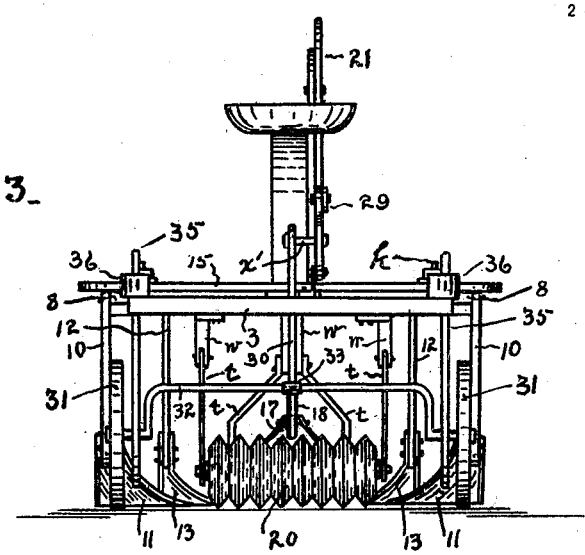
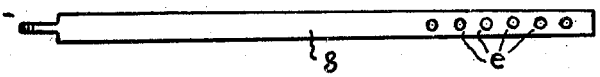
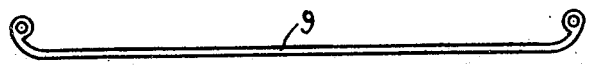
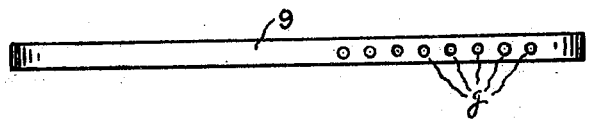
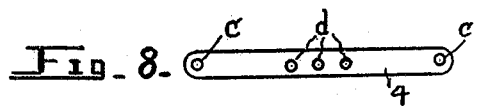

UNITED STATES PATENT OFFICE.

MICHAEL J. McCOY, OF PAPILLION, NEBRASKA.

COMBINED PLOW AND PACKER.

1,412,950. Specification of Letters Patent. Patented Apr. 18, 1922.

Application filed June 21, 1920. Serial No. 390,461.

*To all whom it may concern:*

Be it known that I, MICHAEL J. McCOY, a citizen of the United States, residing at Papillion, in the county of Sarpy and State of Nebraska, have invented certain new and useful Improvements in a Combined Plow and Packer, of which the following is a specification.

This invention relates to a combined plow and packer adapted particularly for use in preparing the ground for seed-planting, and has for its object to provide a machine adapted to clear débris from the front and to form ridges of earth which are packed by operation of the machine, said ridges being of advantage since the ground which has thus been loosened, pulverized and packed is adapted to conserve moisture, ready for planting. The invention also includes means by use of which an operator may readily elevate the plows from the ground, for convenience when "turning about" at the end of a field, and includes convenient means for adjusting the plows to various positions of advantage. With the foregoing objects in view the invention presents a novel construction, combination and arrangement of parts as described herein and claimed, and as illustrated in the accompanying drawing, wherein,—

Figure 1:
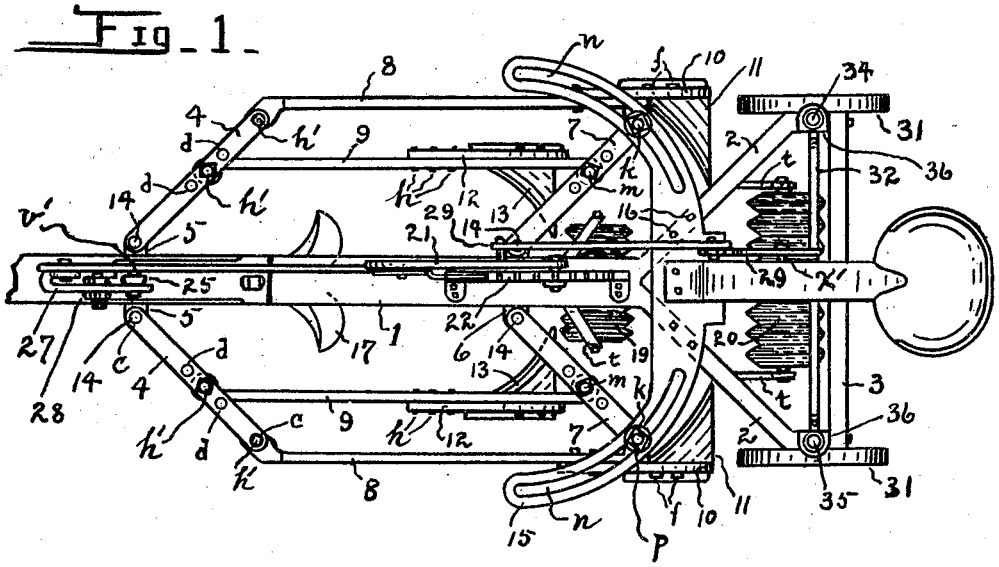
Figure 2:
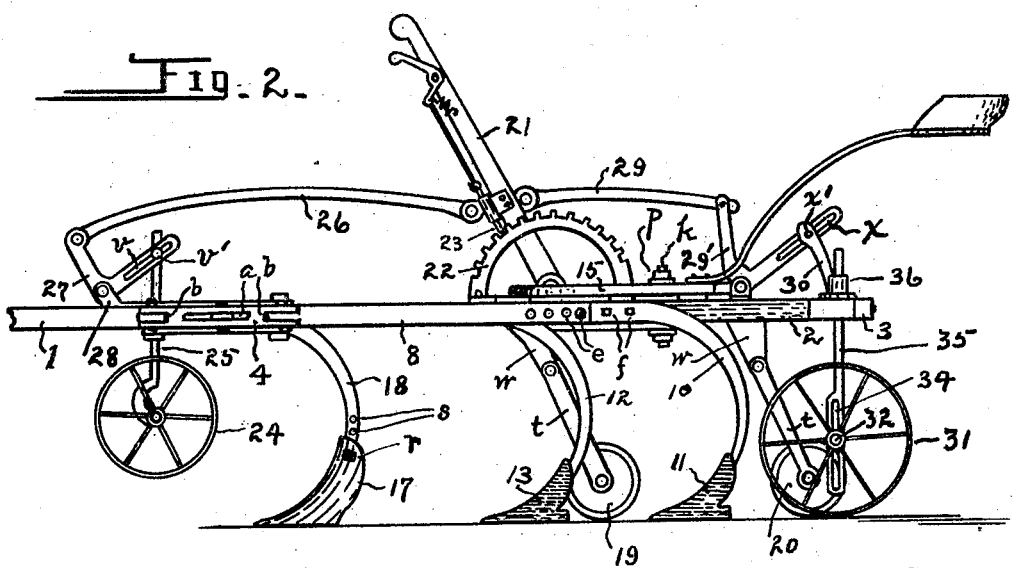

Fig. 1 is a plan view of a combined plow and packer embodying my invention. Fig. 2 is a side view and Fig. 3 is a rear view of the same. Fig. 4 is a plan view of an outer plow-supporting bar. Fig. 5 is a side view of the same. Fig. 6 is a plan view of an inner plow supporting-bar and Fig. 7 is a side view of the same. Fig. 8 is a plan view of a link. Fig. 9 is a side view of the link.

Referring now to the drawing, numeral 1 indicates a plow beam preferably of Y-shape, its rearwardly projecting branches 2 being connected by a cross-bar 3, and these parts provide a frame upon which other parts are mounted.

Numerals 4 indicate a pair of links which are pivotally mounted upon brackets 5, near the front end of the plow-beam, and mounted pivotally upon the opposed brackets 6 which are provided for said plow-beam, rearwardly of brackets 5, are links 7, all of these links preferably being similar, as compared with each other; and as shown in Figs. 8 and 9 they are formed with apertures $a$ and terminal recesses $b$ opening on their sides and each link 4 is provided, near its ends, with apertures $c$, and near its middle with a plurality of apertures $d$ opening on its top and bottom.

Numerals 8 indicate a pair of outer plow-supporting bars, and at 9 are indicated a pair of inner plow-supporting bars, each bar 8 having its respective ends pivotally mounted upon the links 4 and 7, and being provided with apertures $e$ opening on its sides to receive bolts $f$ for securing thereon a standard 10 upon which a plow 11 is secured, and the pair of standards 10 and 10 may be adjusted longitudinally of the bars 8.

The bars 9 are also provided with apertures $g$ as best shown in Fig. 7, and by use of bolts $h$ the pair of hangers 12 may be secured upon said bars at selected longitudinal intervals thereof; and upon each hanger 12 is mounted a plow 13. Bolts are indicated at $h'$ for the pivotal mountings of bars 8 and 9 upon the links 4, and at $k$ and $m$ are indicated bolts for the pivotal mountings, respectively, of bars 8 and 9 upon the pair of links 7. The pivotal mountings for the links 4 and 7 upon their respective brackets are indicated at 14, and as described it will be seen that said links may be swung forwardly or rearwardly to dispose the plows 11 and 13 further from or nearer to the plow-beam; and on account of the provision of apertures $d$ the bars 9 may be disposed at selected distances from the plow beam; and it will be understood that the plows 13 will be disposed equidistant from said plow-beam, this also being true with respect to the plows 11.

At 15 is indicated an adjusting-plate adapted to be disposed upon and transversely of the machine and, preferably, being removably secured thereto by bolts 16, said plate being provided with a pair of curved slots $n$ for receiving the bolts $k$, each slot having the form of a circle's arc the center of which is a pivot 14; and it will be seen that when the links 7 are swung outwardly or inwardly to dispose the plows 11 and 13 further from or nearer to the medial line of the machine, the bolts $k$ will move in the slots $n$, and by rotating the nuts $p$, the links 7 may be maintained stationary with said plate 15, for maintaining the plows of each pair equidistant from the plow beam.

Numeral 17 indicates a shovel plow which is mounted upon a hanger 18, below the plow beam, near the front of the machine, and by means of the bolt $r$ adapted to engage in any one of apertures $s$ of the standard 18, this plow may be adjusted longitudinally of said standard, so that, during operation, it may work in the ground at the same depth as the plows 11 and 13, or at lesser depths.

Numeral 19 indicates a packing cylinder or roller which is disposed rearwardly of the plows 13, and at 20 is indicated a second roller disposed rearwardly of the plows 11, each roller being axially mounted at its ends upon a pair of arms $t$, said arms $t$ for each roller being pivotally mounted upon suitable hangers $w$ which are secured, by any suitable means, to the machine frame.

The machine as described is particularly useful in preparing the ground ready for planting or seeding. The plow 17 may be secured on its hanger so that, during operation, it will enter only a limited distance below the surface of the ground for removing obstructions or débris. When mounted in its lowermost position it will, obviously, form a groove and a pair of longitudinal ridges, the plows 13 operating thereafter to move the earth in a direction inwardly and reverse to the direction to which the earth is moved by the plow 17, and toward the front of the roller 19, said roller operating to pack the loose earth thus moved by the plows 13. The plows 11 operate to throw two furrow-slices toward the front of the roller 20, said roller operating to pack said furrow-slices.

It will be noted that on account of the adjustable features mentioned, the area of ground operated upon by the machine while moving forwardly, may be greater or less, and that the depth for plowing is under control, and that the roller 20 operates to pack the ground which has been moved inwardly by both pairs of plows.

When "turning about" at the end of a field it is obvious that the plows should be removed from and supported above the ground, and therefore means are provided for this purpose. Numeral 21 indicates a hand lever to be used in connection with a toothed sector 22, the pawl 23 engaging between the teeth of the sector in the usual manner. Numeral 24 indicates a wheel which is disposed forwardly of the plow 17, said wheel being axially mounted upon the lower end of a spindle 25 which is slidably mounted in the plow beam. Numeral 26 indicates a coupling bar having pivotal mountings for its respective ends upon the hand lever and one of the arms of a bell-crank 27, the opposite arm of said bell-crank being provided with a slot $v$ for receiving a pin $v'$ which is mounted upon the upper end of the spindle 25, said bell-crank being pivotally mounted in a bracket 28 which is secured to the upper face of the plow beam.

At 29 is indicated a coupling-bar having its respective ends pivotally mounted upon the hand lever 21 and one of the arms of a bell-crank 29', the opposite arm of said bell-crank being provided with a slot $x$ for receiving a wrist-pin $x'$, said wrist-pin, as best shown in Fig. 3, being mounted in the upper end of a link 30.

The axle upon which the wheels 31 rotate is indicated at 32, and, as best shown in Fig. 3, the lower end of the link 30 is provided with a boss 33 for a mounting upon said axle.

As thus described, if the hand-lever is swung rearwardly, the wheels 31 and wheel 24 will be moved downwardly, and since all of the wheels engage the ground at all times, the plows will be moved upwardly, the ends of the axle 32 moving in slots 34 of the aligning-bars 35, said bars 35 being slidably mounted in the apertured bosses 36 which are provided for the machine frame and which operate to maintain the bars 35 in a vertical position.

Also if the hand lever is swung forwardly the plows will move downwardly, and it will be seen that the plows, by use of the hand-lever, may be maintained in a manner to permit plowing at various depths.

While I have described construction in detail, I do not wish to be understood as limiting myself in this respect, and changes in form, size, proportion and minor details may be made, said changes being determined by the scope of the invention as claimed.

I claim:

In a machine for the purpose described, the combination with a tongue having a pair of brackets at its opposed sides and having a second pair of brackets at its opposed sides rearwardly of the first pair, of a pair of horizontally disposed links outwardly of the sides of the tongue and pivotally connected with the first pair of brackets, a second pair of horizontally disposed links outwardly of the sides of the tongue and pivotally connected with the second pair of brackets, a pair of plow-supporting bars pivotally connected with the links of each pair between the ends thereof, a second pair of plow-supporting bars disposed parallel with the first named bars and pivotally connected at their front ends with the outer ends of the first pair of links, an adjusting-plate of semicircular form secured midway between its ends to the tongue and provided with segmental slots adjacent to its ends, and a pair of bolts engaging in the slots of the adjusting-plate and pivotally connecting the outer ends of the second pair of links with the rear ends of the second pair of plow-supporting bars.

In testimony whereof, I have affixed my signature in presence of two witnesses.

MICHAEL J. McCOY.

Witnesses:
 HIRAM A. STURGES,
 ALEX. D. HODGES.